March 14, 1961   J. F. KOPCZYNSKI   2,974,340
CLEANER FOR WINDSHIELD WIPERS
Filed June 17, 1959

INVENTOR
John F. Kopczynski

United States Patent Office 2,974,340
Patented Mar. 14, 1961

2,974,340
CLEANER FOR WINDSHIELD WIPERS
John F. Kopczynski, 1671 Sweeney St., North Tonawanda, N.Y.
Filed June 17, 1959, Ser. No. 820,960
15 Claims. (Cl. 15—250)

This invention relates to the removal of matter adhering to the wiping edges of windshield wiper blades, such as ice and snow. In the automobiles presently used, for example, snow and ice tend to adhere to and accumulate on the windshield wiper blades and interfere with the cleaning action of the blades, and it is often difficult to dislodge such adherent ice and snow from the blades, without stopping the vehicle and manually wiping or breaking loose the adherent ice and snow on the wiper blade. In my prior Patent No. 2,780,825 I provided a device against which the flexible wiping edge of the blade could be caused to bump at times in order to dislodge ice and snow from the wiper blade. This was quite effective, but it did not always fully clean the flexible wiping edge of the blade.

An object of this invention is to provide a cleaning device for the usual wiper blade which can be used to clean the blade while the blade is in the continuous operation of wiping the windshield, or while the blade is moved into its parked position, which can be easily and quickly attached to existing windshield constructions in a simple manner, without special tools, which wipes clean the wiping edge of the blade in a lengthwise direction, which will not obstruct the normal field visibility through the windshield, which will not place an undue drag on the wiper arm, and which will be relatively simple, practical, efficient, convenient, and inexpensive.

Another object is to provide simple, practical and inexpensive means for keeping the wiper blade free of adhering snow and ice, without it being necessary for a vehicle operator to leave the driver's seat to remove snow and ice from the wiper blade.

Other objects and advantages will be apparent from the following description of some embodiments of the invention, and the novel features will be particularly pointed out hereinafter in connection with the appended claims.

Figure 1:
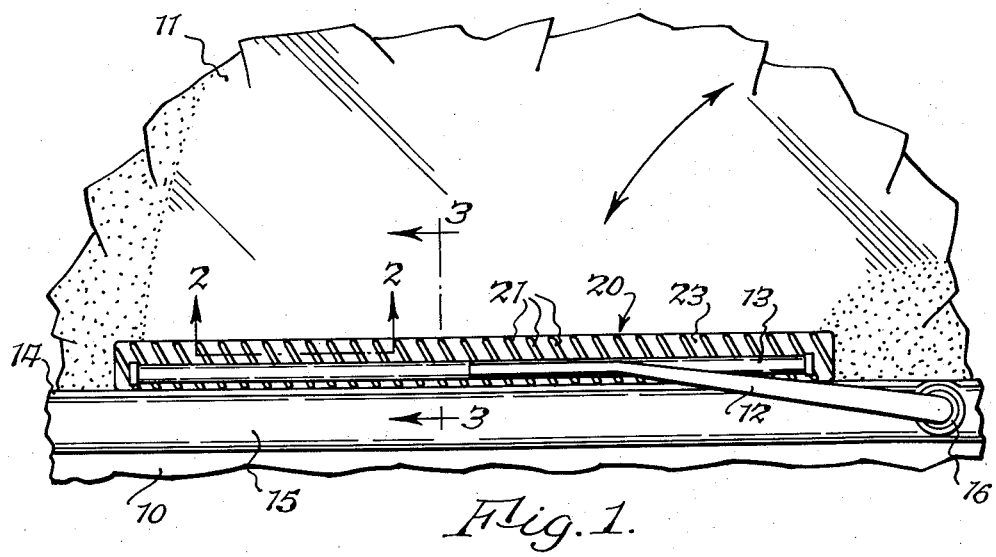
Fig. 1 is a face view of a portion of the windshield of a vehicle, provided with a construction for cleaning the the wiper blade in accordance with this invention, and illustrating one example of it.
Figure 2:
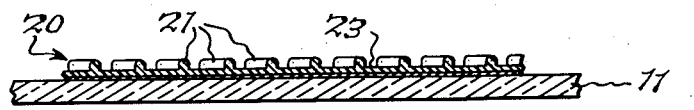
Fig. 2 is a horizontal section of a part of the same, the section being taken approximately along the line 2—2 of Fig. 1.
Figure 3:
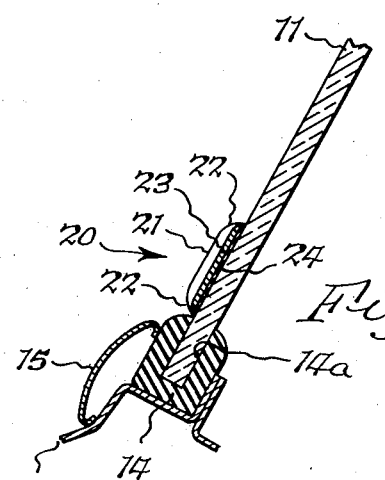
Fig. 3 is a vertical section of a part of the same, the section being taken approximately along the line 3—3 of Fig. 1.

In the example of the invention illustrated in Figs. 1–3, the vehicle body 10 mounts a transparent windshield panel 11, and the usual wiper arm 12 carrying a wiper blade 13 is disposed at the exposed face of the panel 11. An elastic rubber or rubber-like strip 14, carried by the body 10, has a longitudinally extending channel or groove 14a (Fig. 3) in which an edge of the panel 11 is snugly received and confined. A trim molding strip 15 on the body 10 covers most of the rubber strip 14 and retains the panel 11 and strip 14 in the usual opening in the body 10.

The wiper arm 12 and its wiper blade 13 are mounted on a pivot 16 of the body 10 to swing in an arc, back and forth over a large area of exposed face of panel 11, under the action of a suitable or usual motor, or source of operating power, not shown. Wiper motors of this type often have a parking position at one end of its stroke, and such a parking position for the wiper arm and its blade is illustrated in Figs. 1–3. In some cases, this parking position is just beyond and bordering the path taken by the wiper blade in its continuous operation, but into which the blade is automatically moved when operation of the wiper blade by the wiper motor or power source is interrupted. In other cases the parking position may be merely in one end of the path of the blade in its continuous operation.

In accordance with one example of this invention, a thin, molded elongated plate-like strip 20 of transparent material, such as a transparent plastic material, is disposed flat against the transparent panel 11, along the margin of the area of the panel 11 that is cleaned by the wiper blade in the latter's back and forth movement. In this example, the wiper blade oscillates from the position shown in Fig. 1 in a clockwise direction, and then back to the position shown in Fig. 1, where it has moved only once over the exposed face of the strip or member 20. This exposed face of strip 20 is provided with a plurality of low ridges or ribs 21, parallel to one another, spaced apart along the length of the strip 20, extending from side to side or generally crosswise of the length of the strip 20, and at an angle less than 90° from both the length of the strip and a normal to such length.

The strip 20 is preferably as long or longer than the wiper blade, and the upper end of each rib overruns or overlaps the lower end of a next adjacent rib, that is, the lead end of each rib overlaps the trail end of a next succeeding rib, progressively along the strip 20. Thus, when the free edge of the wiper blade moves over the ribs 21, the latter will together wipe the wiping edge along its entire length. The ribs 21 are spaced far enough apart to resist filling of the spaces between them with snow or ice wiped from the wiper blade. These ribs are also only slightly raised ridges, as for example of a height approximately equal to the thickness of the strip 20 or about 1/16 inch in height. The shallow spaces between the ribs also aid in keeping them free of snow and ice, since there are less areas of side walls of the ribs for snow and ice to adhere to. The ends of the ribs 21 are rounded, as at 22 (Fig. 3), so that both leading and trailing ends of the ribs will offer a minimum resistance to the wiping edge of the wiper blade as it rides up and over the ribs. The base portion 23 of the strip 20 is secured by a layer 24 of cement or adhesive to the outside or exposed face of the transparent panel 11.

In the example illustrated in Figs. 1–3, when the driver or operator of the vehicle finds that the wiper blade is not adequately cleaning the panel 11, such as is due to snow or ice adhering to the wiper blade and causing the wiper edge to ride slightly away from the panel face, the control for the wiper motor is operated to inactivate the motor, whereupon the blade will return to its parking position shown in Fig. 1 in which the wiping edge of the wiper blade will ride upon and somewhat across the strip 20 and its ribs 21, during which the ribs will wipe the wiping edge of the wiper blade by a plurality of small increments that together equal about the entire length of the wiper blade. This removes material such as ice or snow adhering to the wiping edge of the wiper blade. Then the wiper motor or source of operating power is reactivated and the wiper will wipe the panel 11 clean again over the area of the panel over which the wiper blade moves. The sudden flexing of the free side edge of the wiper blade as it engages and rides up the ribs 21 will also aid in the disengagement of ice and snow from the blade. When the wiper motor or source of power is reactivated, a reversal of the wiping action of the ribs on the wiping edge of the blade will occur, since the ribs will wipe the edge of the blade in the opposite direction. Thus one obtains two wiping or cleaning actions each time the blade is stopped and restarted. In the usual automobile, a defrosting duct usually discharges heated air against the inner face of the panel 11 at about where the wiper terminates, and this gives maximum heat to the strip 20 by conduction through the panel. This also aids in keeping the spaces between the ribs clear of ice and snow. If the wiper blade does not have a parking position, the strip 20 will be placed at one end of the travel of the wiper blade, so that the wiper edge of the blade will ride up and nearly across the strip 20.

While there are advantages in placing the strip 20 at about the parking position of the wiper blade, or at one end of its movement, there are different advantages in placing the strip 20 in the path of the wiper blade at any selected position intermediate of the limits of movement of the blade. For example, as shown schematically in Fig. 5, the strip 20 may be disposed nearly upright on the panel 11 so that the wiper blade will run entirely across it while moving in each back and forth direction. The strip can be secured by the layer of cement or adhesive to the panel 11 in such an upright position, and when the strip is made of transparent material and is thin it will not objectionably interfere with the driving field vision of the operator of the vehicle.

Figure 4:
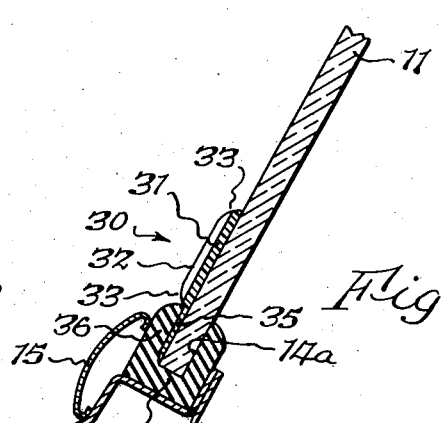
Fig. 4 is a section somewhat similar to Fig. 3 but of a modification of the invention.

In the example of the invention illustrated in Fig. 4, a strip 30, corresponding in function to strip 20 of Figs. 1–3, is provided with a base portion 31. The strip 30 with its base portion is made of thin transparent plastic and flexible material, and in the form of an elongated strip. It has the parallel, spaced apart low ridges or ribs 32 with rounded ends 33 that merge into the base portion 31, as explained for ribs 21 and ends 22 of Figs. 1–3. The base portion 31 has a thin extension or blade 35 that is free of the ribs or ridges 32, and this extension or blade can be inserted into the channel of the rubber strip 14 between the panel 11 and the outside wall of the channel as defined by the leg 36 of the channel. This snugly and tightly, but detachably, confines the blade or extension 35 in place and by it holds the base portion against the front or exposed face of panel 11, to lie along the lower margin of the panel outside of the rubber strip 14, as the strip 20 was located in Figs. 1–3. This particular form of mounting eliminates the need of cement or adhesive to secure the strip 30 at the parking position or end of travel of the wiper blade. Its operation will be as explained in connection with the example shown in Figs. 1–3.

Figure 5:
Fig. 5 is a schematic illustration on a reduced scale of a construction similar to that shown in Figs. 1–3 but with the cleaning strip disposed to be fully crossed by the wiper blade at each travel of the blade.
Figure 6:
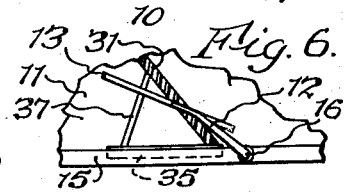
Fig. 6 is similar to Fig. 5 but using the securing means of Fig. 4 for securing the cleaner strip in position.

In Fig. 6 the manner of mounting the cleaning strip 30 is similar to that explained for Fig. 4, but the cleaning part of the strip is disposed in any selected position intermediate of the travel limits of the wiper blade, as explained for Fig. 5, but the base portion 31 of this strip is attached at one end and by a strut 37 to the flange, extension or blade, corresponding to the extension or blade 35 of Fig. 4, which is snugly confined in the channel of the rubber strip 14 between the panel 11 and the outer leg of the channel. The strip base portion 31 and the strut 37 are made of thin, transparent material, such as of any suitable plastic material, and hence will not seriously interfere with the visible field of the driver or operator of the vehicle. In this example the wiper blade, in riding across the strip 30, will be wiped clean of ice and snow as the wiper blade moves in each direction in its operation. This strip base portion 31, with or without the strut 37, may also be secured to the panel 11 by cement or an adhesive if desired.

It will be understood that various changes in the details, materials, positions and arrangements of parts, which have been herein described and illustrated in order to explain the nature of the invention, may be made by those skilled in the art within the principle and scope of the invention, as expressed in the appended claims.

I claim:

1. An attachment for windshields of the type having a transparent panel secured in a mounting frame, and a wiper arm movable back and forth and carrying a wiper blade that moves over and in contact with the front face of an area of the panel to clean it of water, snow and ice, said attachment comprising a thin, elongated relatively narrow strip to be mounted adjacent the front face of the panel in a position in which the wiping edge of the wiper blade moves at least partially across and in contact with the exposed face of said strip within some part of its motion over the panel face, the exposed face of said strip having a plurality of raised ribs of short height, spaced apart along the length of the strip, oblique to the direction of travel thereover of the wiping edge of said blade, the leading end of each rib approximately overrunning with the trailing ends of the ribs next to it along the length of the strip and in directions crosswise of the direction of travel thereover of the wiper blade, whereby the wiping edge of said blade in moving over the ribs will be wiped in a direction lengthwise of the blade by such ribs.

2. The attachment according to claim 1 wherein said strip is of transparent material.

3. An attachment for windshields of the type in which a transparent panel is suitably mounted, and a wiper member is movable back and forth and carries a wiper blade that has a flexible, elastic wiper edge that moves over and in wiping contact with an area of that face of the panel which may be exposed to water, ice and snow, said attachment comprising a thin, relatively narrow, elongated element that can be mounted along said exposed face of said panel in a position in which the wiper edge, in the movement of said member, can move at least partially across said element broadside in a direction generally crosswise of the length of said element, said element having on its exposed face which is engaged by the wiper edge a plurality of raised ribs that are oblique to the length of the element, and spaced apart along its length, whereby when the wiper blade wiper edge moves in contact with the ribbed face of said element, the ribs will wipe said wiper edge in a direction lengthwise thereof and thereby remove matter adhering to the wiper edge portion of the wiper blade.

4. The attachment according to claim 3 wherein the ends of said ribs adjacent one side edge of said element overrun the end of adjacent ribs adjacent the opposite side edge of said element.

5. An attachment for windshields of the type in which a transparent panel is suitably mounted with at least one edge of the panel received in a channel in an elastic rubber member, and a wiper blade is moved back and forth across an area of said panel and carries a wiper blade with a flexible elastic wiping edge, that moves over and in contact with an area of that face of said panel to which water, ice and snow may adhere, said attachment comprising a flat, sheet-like element that can fit flat against a part of an area of said panel over which said wiping edge may move, and having a thin edge margin that may fit in said channel along an edge margin of said panel which is also received in said channel, so as to be confined thereby against said panel, said element having on its exposed face a plurality of slightly raised ribs that are spaced apart along and extend generally crosswise of the length of said element, whereby the ribs, when engaged by the wiper edge, will dislodge ice or snow adhering to the wiper edge.

6. The attachment according to claim 5, wherein said element extends along the margin of the area wiped by said wiper edge in the path of the wiper edge as the wiper edge approaches one limit of its possible back and forth movement over said panel.

7. An attachment for vehicle windshields of the type in which an edge of a transparent panel is received snugly in a channel in an elastic rubber strip, and a wiper arm with a flexible wiper edge is movable back and forth over an area of said panel adjacent said strip, which comprises a thin member which can be inserted in said channel between a side wall of said channel and the panel face which may be exposed to ice and snow, and having a thin, narrow, elongated, extension portion overlying a part of said panel face upon which said wiper edge can move as it reaches its limit of said movement in one direction, said extension portion having on its exposed face, when it is disposed against said panel, a plurality of only slightly raised ribs that extend in directions generally crosswise of but oblique to the wiper edge which may move thereover, and spaced apart along the length of the extension, whereby when the wiper edge moves over the extension it will be wiped somewhat lengthwise by said ribs to remove from such wiper edge any snow and ice adhering to that edge.

8. The attachment according to claim 7 wherein said extension is of transparent material.

9. In a windshield construction of the type having a transparent panel, a support for said panel, a wiper arm carried by said support for movement back and forth over an exposed face area of said panel, and a wiper blade carried by said arm and having a free, flexible elastic wiper edge pressed by said arm against said area and wiping a part of said exposed panel face, the combination therewith of a thin, flat, elongated, narrow member secured flat against said exposed panel face in the path of possible movement of said wiper edge, the outer face of said member over which said wiper edge can move having a plurality of spaced narrow ribs which flex the wiper edge as the latter moves thereover to dislodge ice and snow that may adhere to the wiper edge, wherein said ribs extend generally crosswise of the length of said member and said wiper edge extends in a direction generally lengthwise of the member as it moves thereover.

10. The construction according to claim 9, wherein said ribs are oblique to the wiper edge as the latter moves over the ribs so that the ribs will wipe the wiper edge somewhat lengthwise of the wiper edge.

11. In a windshield construction of the type having a transparent panel, a support for said panel, a wiper arm carried by said support for movement back and forth over an exposed face area of said panel, and a wiper blade carried by said arm and having a free, flexible elastic wiper edge pressed by said arm against said area and wiping a part of said exposed panel face, the combination therewith of a thin, flat, elongated, narrow member secured flat against said exposed panel face in the path of possible movement of said wiper edge, the outer face of said member over which said wiper edge can move having a plurality of spaced narrow ribs which flex the wiper edge as the latter moves thereover to dislodge ice and snow that may adhere to the wiper edge, wherein said member is of transparent material, and said ribs are oblique to the wiper edge as the latter moves over them whereby each rib will wipe the wiper edge in a lengthwise direction.

12. In a windshield construction of the type having a transparent panel, a support for said panel, a wiper arm carried by said support for movement back and forth over an exposed face area of said panel, and a wiper blade carried by said arm and having a free, flexible elastic wiper edge pressed by said arm against said area and wiping a part of said exposed panel face, the combination therewith of a thin, flat, elongated, narrow member secured flat against said exposed panel face in the path of possible movement of said wiper edge, the outer face of said member over which said wiper edge can move having a plurality of spaced narrow ribs which flex the wiper edge as the latter moves thereover to dislodge ice and snow that may adhere to the wiper edge, wherein said member having a thin blade at its edge adjoining said support, and said support having a rubber gasket with a channel in which an edge of the panel and an edge portion of said member are snugly confined, and by which said member is secured in operating position over said panel.

13. The construction according to claim 9, wherein said member extends along the panel just within the final possible travel of the wiper blade to carry the wiper edge over the ribs.

14. In a windshield construction of the type having a transparent panel, a support for said panel, a wiper arm carried by said support for movement back and forth over an exposed face area of said panel, and a wiper blade carried by said arm and having a free, flexible elastic wiper edge pressed by said arm against said area and wiping a part of said exposed panel face, the combination therewith of a thin, flat, elongated, narrow member secured flat against said exposed panel face in the path of possible movement of said wiper edge, the outer face of said member over which said wiper edge can move having a plurality of spaced narrow ribs which flex the wiper edge as the latter moves thereover to dislodge ice and snow that may adhere to the wiper edge, wherein said member extends along said panel just within the final possible travel of the wiper blade and at the parking position of the blade.

15. In a windshield construction of the type having a transparent panel, a support for said panel, a wiper arm carried by said support for movement back and forth over an exposed face area of said panel, and a wiper blade carried by said arm and having a free, flexible elastic wiper edge pressed by said arm against said area and wiping a part of said exposed panel face, the combination therewith of a thin, flat, elongated, narrow member secured flat against said exposed panel face in the path of possible movement of said wiper edge, the outer face of said member over which said wiper edge can move having a plurality of spaced narrow ribs which flex the wiper edge as the latter moves thereover to dislodge ice and snow that may adhere to the wiper edge, wherein said member being disposed just within the path of the final movement of the blade in one direction and having a thin blade at its part near said support, and said support having an elastic rubber-like strip with a channel in which the panel edge and said blade are snugly confined, face to face, for supporting the member in its position on the exposed panel face.

References Cited in the file of this patent

UNITED STATES PATENTS

| | | |
|---|---|---|
| 1,431,357 | Benkiser | Oct. 10, 1922 |
| 1,732,417 | Prichard | Oct. 22, 1929 |